J. H. JANN.
TURRET OPERATING MECHANISM FOR AUTOMATIC SCREW MACHINES.
APPLICATION FILED AUG. 21, 1907.
1,109,843.
Patented Sept. 8, 1914.
5 SHEETS—SHEET 3.
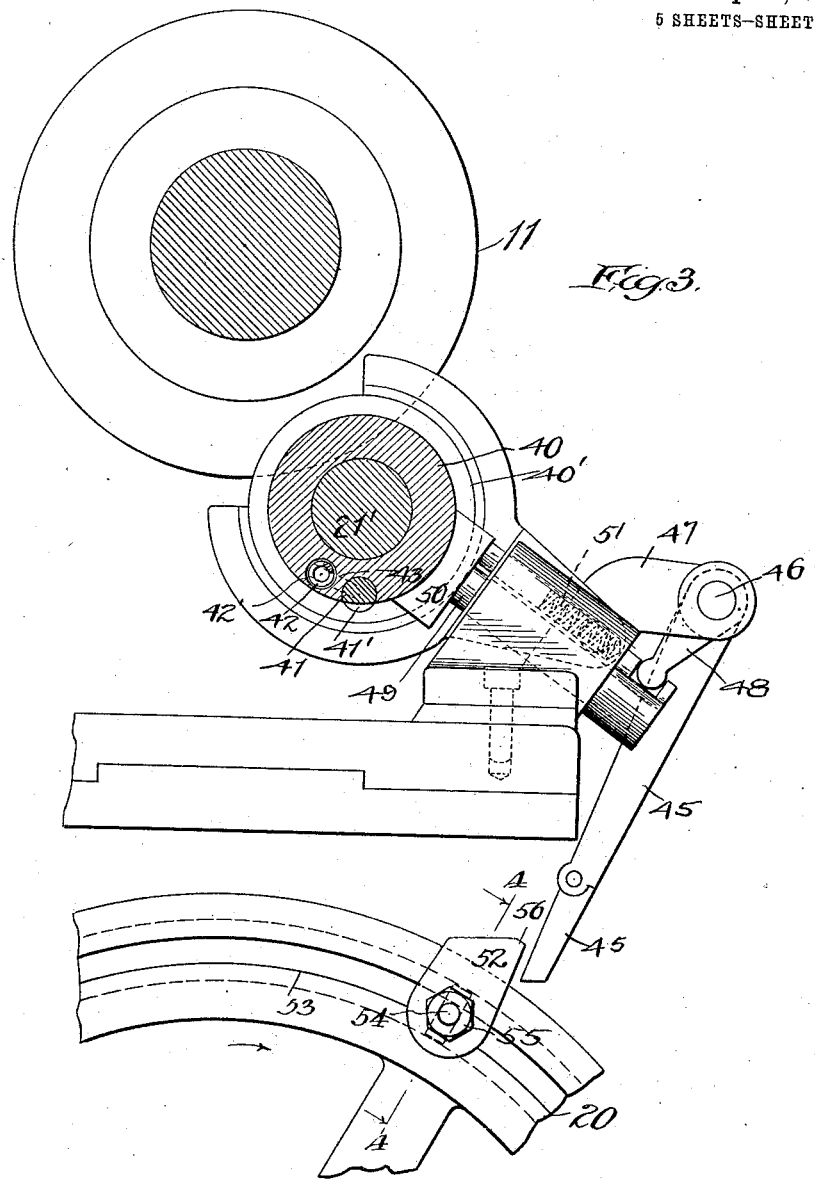
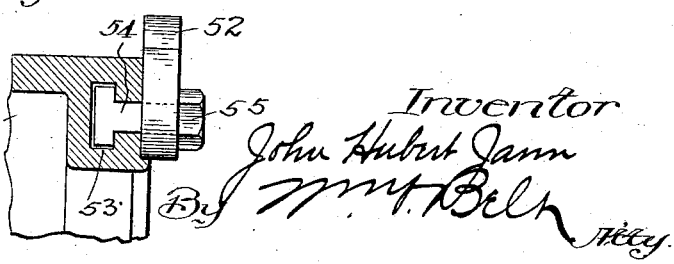

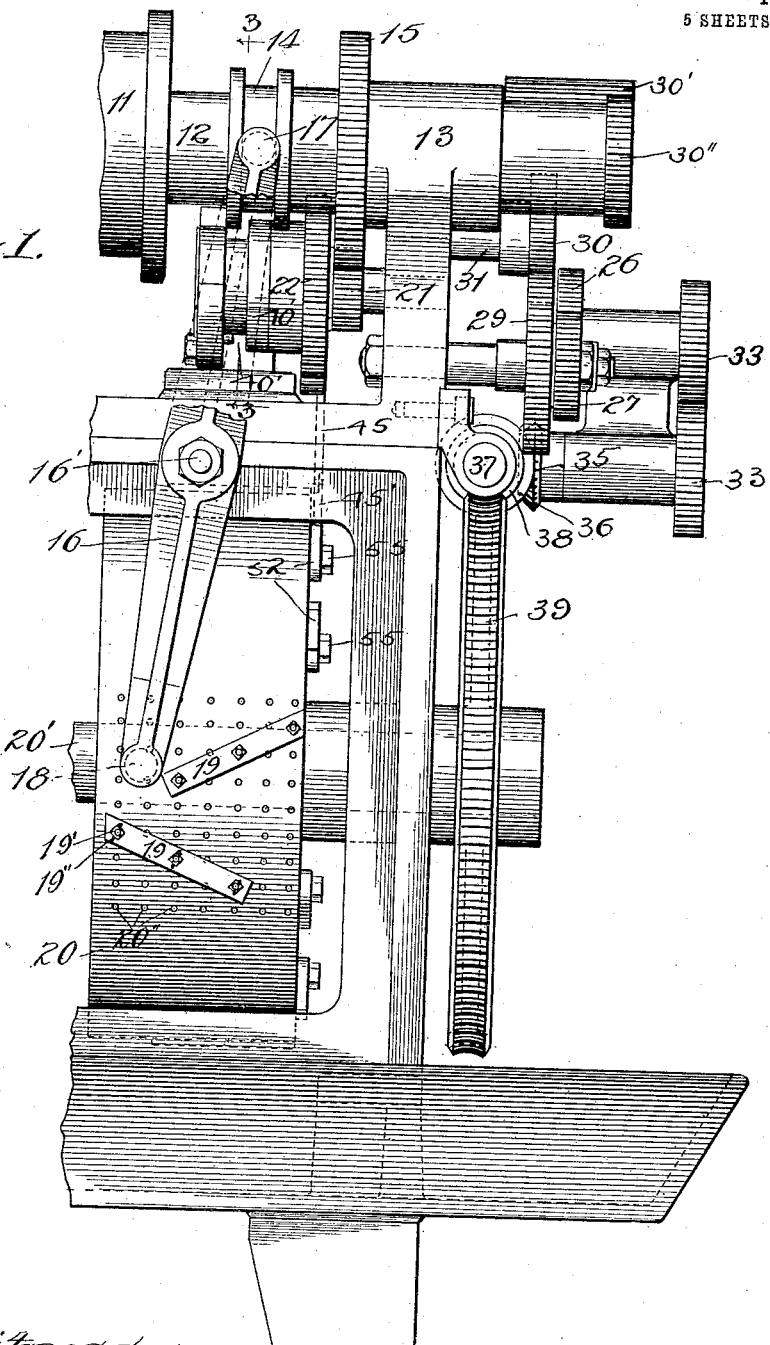

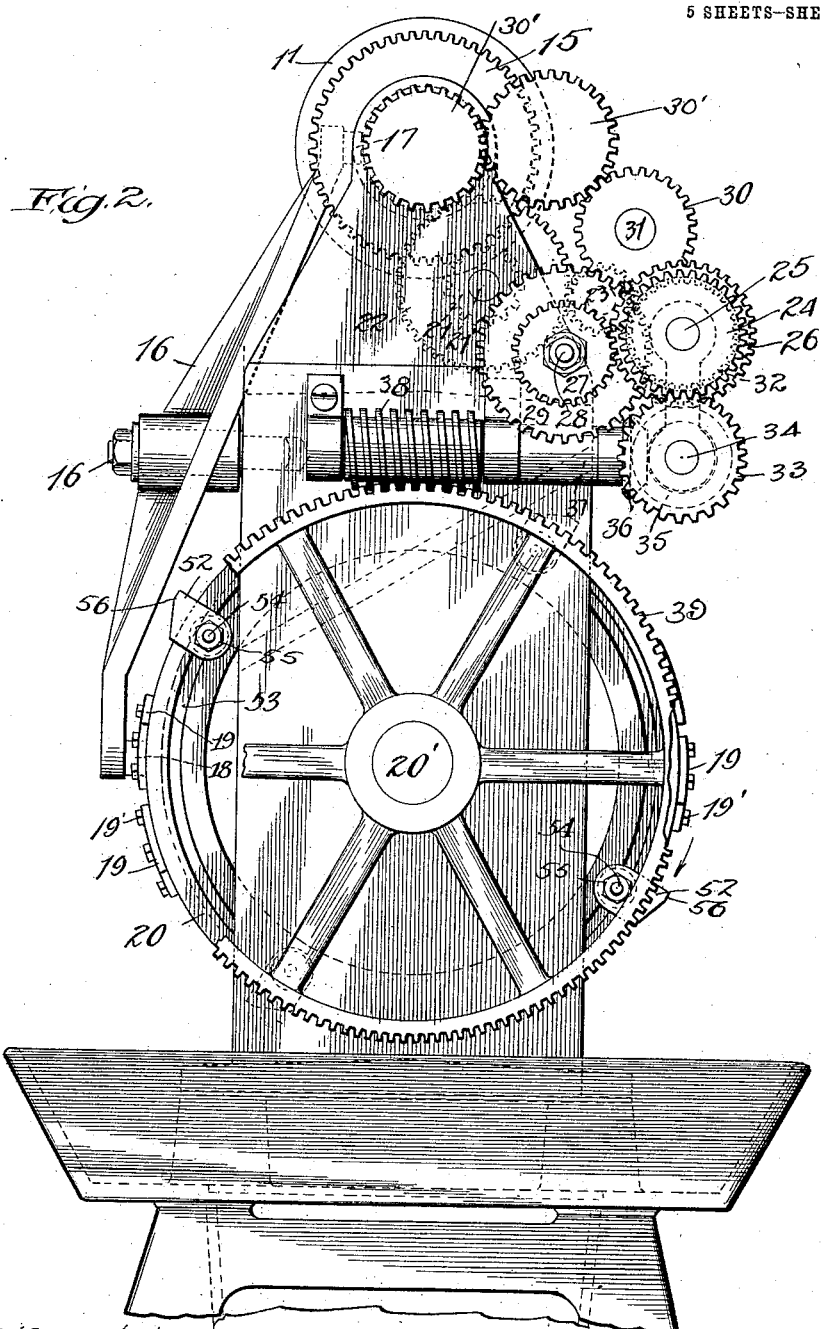

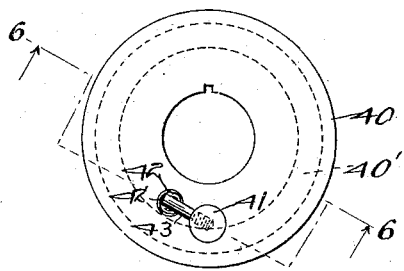
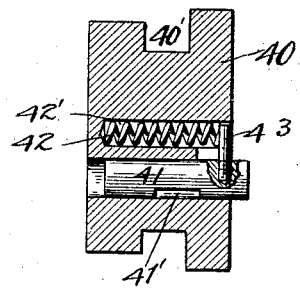
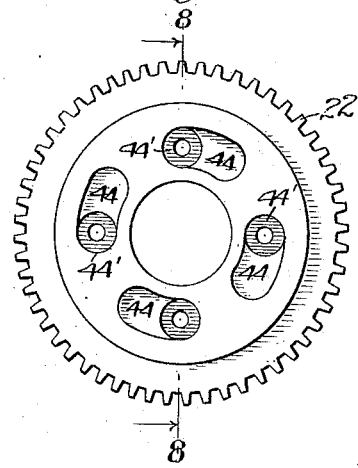
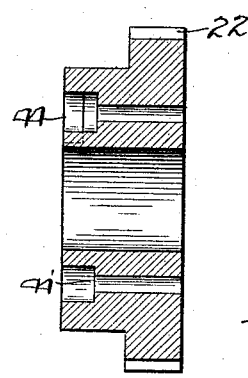
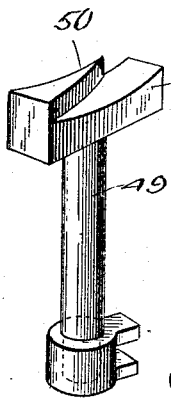
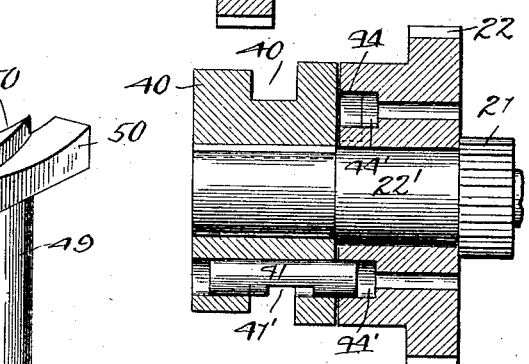

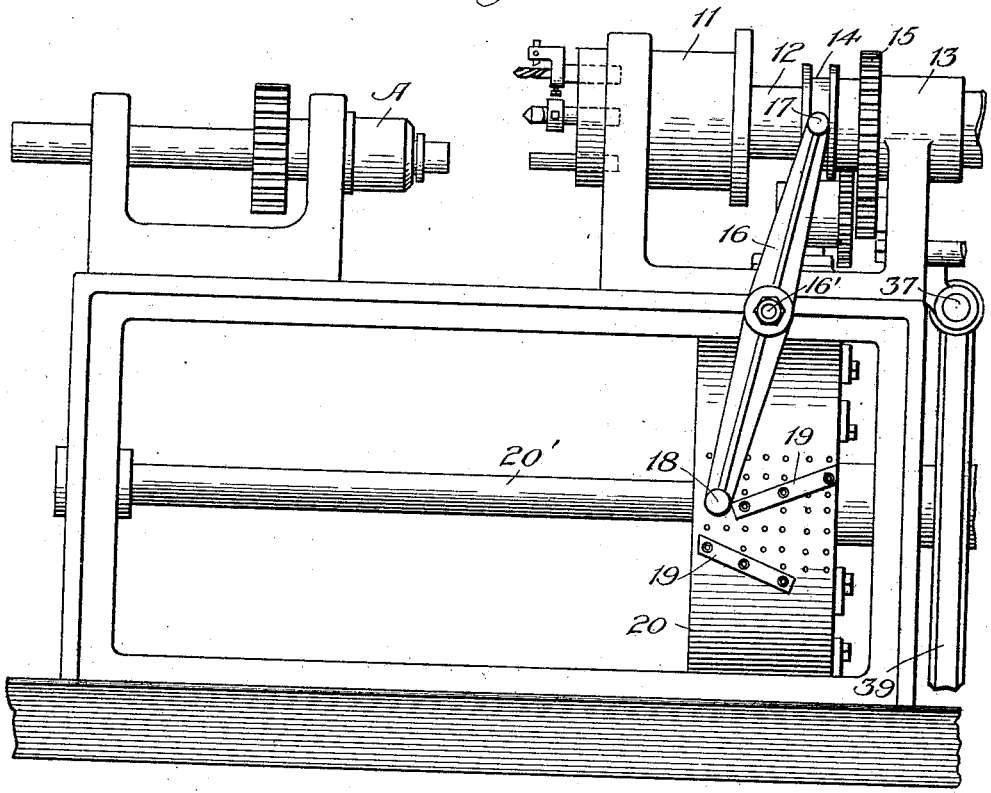
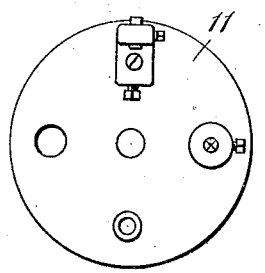

UNITED STATES PATENT OFFICE.

JOHN HUBERT JANN, OF CHICAGO, ILLINOIS.

TURRET-OPERATING MECHANISM FOR AUTOMATIC SCREW-MACHINES.

1,109,843.  Specification of Letters Patent.  Patented Sept. 8, 1914.

Application filed August 21, 1907. Serial No. 389,426.

*To all whom it may concern:*

Be it known that I, JOHN HUBERT JANN, a citizen of the United States, residing at Chicago, in the county of Cook and State of Illinois, have invented new and useful Improvements in Turret-Operating Mechanism for Automatic Screw-Machines, of which the following is a specification.

The object of this invention is to provide an improved mechanism for operating the turret of an automatic screw machine to enable a rapid operation of the machine whether the turret carries the maximum number or a less number of tools. And a further object of the invention is to avoid the reciprocation of the turret when a tool socket is skipped and provide for a reciprocation of the turret only for each tool it carries.

The invention also has in view to provide a mechanism of simple and substantial character for turning and reciprocating a screw machine turret.

In the accompanying drawings illustrating the invention Figure 1 is a front elevation showing as much of the frame of the screw machine as is necessary to indicate the position and arrangement of my improved mechanism. Fig. 2 is an end elevation. Fig. 3 is an enlarged sectional view on the line 3—3 of Fig. 1. Fig. 4 is a detail sectional view on the line 4—4 of Fig. 3. Fig. 5 is a detail view of the clutch collar. Fig. 6 is a sectional view on the line 6—6 of Fig. 5. Fig. 7 is a detail view of the clutch gear. Fig. 8 is a sectional view on the line 8—8 of Fig. 7. Fig. 9 is a detail view of the clutch bolt operating plunger. Fig. 10 is a detail sectional view. Fig. 11 is a side elevation of a screw machine embodying the features of the present invention, illustrating the relation of the tool holders with respect to the work holder. Fig. 12 is a face view of the turret showing some tools in place.

Referring to the drawings the turret 11 has its shank 12 slidably mounted in the frame 13 of the screw machine. Fig. 11 of the drawings illustrates the relation between the tool holders of the turret and the work holder A. A grooved collar 14 is rigidly mounted on the shank of the turret and a gear 15 is keyed to the shank of the turret by a feather (not shown), in a familiar manner to enable the gear to impart a rotary motion to the turret but without participating in the reciprocating movement of the turret and shank. A lever 16 is pivotally mounted at 16' on the frame of the machine and a roller 17 on the upper end of this lever is arranged in the grooved collar 14. A roller 18 on the lower end of the lever 16 is engaged by cams 19 on a cam drum 20 mounted on the shaft 20' suitably journaled in bearings in the frame. The cams for actuating the lever 16 are formed by strips secured on the surface of the drum by bolts 19' in an angular relation to the axis of the drum and to each other in order to provide for the proper oscillation of the lever to reciprocate the turret. The drum is provided with a plurality of holes 20" and the strips have slots 19" to receive the bolts 19' whereby the adjustment of the strips to proper position can be readily and easily effected.

The gear 15 is driven by a gear 21 on the clutch shaft 21'. The gears 15 and 21 are proportioned in diameter in relation to the number of tool sockets in the turret, that is to say if the turret has four tool sockets the diameter of the gear 15 will be four times that of the gear 21 and if the turret has six tool sockets the diameter of the gear 15 will be six times that of the gear 21. The arrangement is such that if the gear 21 makes one complete revolution at a time it will index the turret successively to each of the tool sockets therein and if the gear 21 makes two revolutions at each operation of the machine it will index the turret to every other tool socket.

A large gear 22 is loosely mounted on the elongated hub 22' of the gear 21 (Figs. 1, 8, 10) and this gear 22 meshes with a gear 23 which in turn meshes with a gear 24 on a shaft 25 (Fig. 2). This shaft 25 carries a gear 26 which meshes with a gear 27 on the shaft 28 and on this latter shaft is a gear 29 which meshes with a gear 30 on the power shaft 31. A gear 32 on shaft 25 meshes with a gear 33 on a shaft 34 which carries a beveled gear 35 meshing with a beveled gear 36 on the worm shaft 37. This worm shaft is provided with a worm 38 which meshes with a worm gear 39 on the cam shaft 20' (Figs. 1, 2). The gear 30 also meshes with an intermediate gear 30' which in turn meshes with a gear 30" which drives the die holder (not shown). The several shafts hereinbefore mentioned are suitably supported in bearings on the main frame of the machine.

A clutch collar 40 having a groove 40' (Figs. 5, 6) is rigidly mounted on the hub 22' of gear 21 (Figs. 1, 10) and it is provided with a clutch bolt 41 normally pressed outward by a spring 42. The spring is confined within an opening 42' in the clutch collar 40 by a pin 43 on the clutch bolt (Fig. 6). The clutch bolt projects into the groove 40' and is provided with a recess 41' to register with said groove. The gear 22 (Figs. 7, 8) is provided with a plurality of sockets 44 to receive the clutch bolt 41 whereby locking engagement is made between the clutch collar 40 and the gear 22. Hard steel plugs 44' are secured in the sockets 44 to prevent wear. The gear 22 is mounted to run continuously on the hub 22' of the gear 21 and is automatically locked by the clutch bolt to the clutch collar to turn the gear 21 and the gear 15 to index the turret. It will therefore be understood that the gears 15 and 21 are stationary while the tools are doing their work and only move to turn the turret and index another tool in position for work.

A lever 45 is mounted on a rock shaft 46 supported in a bracket 47 on the main frame (Fig. 3). An arm 48 on the shaft 46 operates a plunger 49 which carries a shoe 50 arranged to travel in the groove 40' of the collar 40. This shoe has a wedge 50' (Fig. 9) which engages the clutch bolt 41 and withdraws and holds it out of engagement with the clutch gear 22, the shoe being held in operative engagement with the clutch bolt by a spring 51 (Fig. 3). The lever 45 has a pivoted finger 45' which is arranged to be engaged by a tripper 52 fastened to the cam drum 20 and projecting beyond the periphery thereof (Fig. 3). The cam drum has a peripheral groove 53 to receive the head of a bolt 54 and the bolt is held in adjusted position and the tripper secured in place on the drum by a nut 55 on the bolt (Fig. 4). A tripper is provided for each tool and when a tool is omitted from the turret a tripper will be taken off of the drum. When the plunger 49 is operated to withdraw the wedge from engagement with the clutch bolt, the latter is projected forward by its spring into one of the sockets 44 and the turret is then turned to bring another tool into operative position. The wedge on the plunger is held out of engagement with the clutch bolt while the toe 56 of the tripper is in engagement with the finger 45' of the lever 45. Therefore when it is desired to use tools in all of the sockets of the turret, (assuming that there are four) the trippers, one for each tool socket, will each be made with a toe which will engage with the finger 45' a sufficient length of time to hold the wedge out of engagement with the clutch bolt and permit the shaft 21' to make a complete revolution, thereby turning the turret a quarter turn and indexing the four tools successively in operative position. If it is only desired to use two tools on the turret provided with four tool sockets, only two trippers are used but the toe of each tripper is sufficiently widened to provide for holding the wedge 50' out of engagement with the clutch bolt until the clutch shaft and gear 21 have made two complete revolutions, sufficient to turn the turret a half turn. The turret is turned a half turn, to skip a socket, without reciprocating the turret and this saves considerable time and avoids wear of the parts. When the tripper passes the lever finger 45' the spring 51 returns the wedge into position in the collar groove to engage and withdraw the clutch bolt from engagement with the gear 22 whereby the turret turning mechanism is brought to rest, and at this time the lever 16 is operated to reciprocate the turret and carry the tool to and from the work. The pivoted finger 45' which constitutes a part of the lever 45 enables the drums to be turned backward without operating the plunger.

The invention is simple in construction and operation and provides for automatically reciprocating the turret to carry each tool to and from the work and for turning the turret without reciprocating it to bring the tools carried thereby successively into operative position. As heretofore pointed out the invention provides for reciprocating the turret only when a tool is indexed for operation and thus I avoid the loss of time and wear and tear on the parts which results from reciprocating the turret for each socket thereof when the tools are omitted from some of the sockets. The machine is automatic in action and may be operated with great rapidity, and it can be readily adapted for use with the maximum number of tools the turret is capable of holding or with a less number, as may be desired.

It will be observed that in my invention the turret is only reciprocated for the purpose of carrying the tools to and from the work and not for the purpose of turning the turret to index the tools. In fact the turret is in a fixed position, which is, in this adaptation of the invention, the initial position of its reciprocating movement, when it is turned to index the tools. And it will also be observed that the turret can not have its reciprocating movement until a tool has been properly indexed and this is true whether there is a tool in each socket or whether some of the sockets are empty. In the latter case the turret continues to turn, skipping the empty socket or sockets until a tool is indexed and during this turning movement the turret remains in its fixed position and does not reciprocate.

What I claim and desire to secure by Letters Patent is:

1. In a machine of the character described, the combination with a work-holder, a turret having a series of tool holders, and indexing means therefor, of means for controlling the operation of the indexing means to rotatably set the turret to index the tool-holders with respect to the work-holder by a continuous uniform movement from one index position to a successive index position or from one index position to a non-successive index position and skipping the intermediate index position or positions between said non-successive index positions.

2. In a machine of the character described, the combination with a work-holder and a turret having a series of tool-holders, of indexing means for the turret including a continuously operating driving element and a drive-connection extending between the driving element and the turret whereby there may be imparted to the turret a complete rotation thereof by a continuous movement of the turret, and means for controlling the operation of the indexing means to rotatably set the turret to index the tool-holders with respect to the work-holder by a continuous uniform movement from one index position to a successive index position or from one index position to a non-successive index position and skipping the intermediate index position or positions between said non-successive index positions, said controlling means comprising a clutch included in the said drive-connection, a clutch disconnector normally holding the clutch elements disconnected, and a trip device for releasing the clutch disconnector including a rotating element having a plurality of tappets adjustable upon the rotating element, the clutch disconnector lying in the path of the tappets.

JOHN HUBERT JANN.

Witnesses:
Wm. O. Belt,
M. A. Kiddie.